United States Patent [19]

Kriegel

[11] Patent Number: 4,993,992
[45] Date of Patent: Feb. 19, 1991

[54] SINGLE STAGE ENGAGEMENT COUPLING

[75] Inventor: Jon M. Kriegel, Rochester, N.Y.

[73] Assignee: Eastman Kodak Company, Rochester, N.Y.

[21] Appl. No.: 453,732

[22] Filed: Dec. 20, 1989

[51] Int. Cl.$^5$ .......................... F16C 1/26; F16D 3/64
[52] U.S. Cl. ..................................... 464/137; 464/901
[58] Field of Search ............... 464/106, 137, 138, 901

[56] References Cited
U.S. PATENT DOCUMENTS

| | | | |
|---|---|---|---|
| 2,295,003 | 9/1942 | Natkins | 64/14 |
| 2,439,479 | 4/1948 | Mackmann | 464/137 |
| 2,720,765 | 10/1955 | Drexler | 464/137 X |
| 3,205,682 | 9/1965 | Porter | 64/14 |
| 3,313,125 | 4/1967 | Hein | 64/14 |
| 3,542,178 | 11/1970 | Ripple | 464/901 X |
| 3,545,585 | 12/1970 | Eaton | 192/108 |
| 3,636,729 | 1/1972 | Patel | 64/14 |
| 3,815,380 | 6/1974 | Esmay | 464/901 X |
| 4,172,369 | 10/1979 | Hayes et al. | 64/14 |
| 4,557,703 | 12/1985 | Riven | 464/73 |

Primary Examiner—Thomas R. Hannon
Attorney, Agent, or Firm—Tallam I. Nguti

[57] ABSTRACT

A flexible coupling for effecting a precisely aligned and repeatable blind mounting of the driver and driven halves thereof at a single time and in a single stage. The drive half can toggle and includes a plurality of multi-length teeth, and the driven half includes a rotatable disc member having a plurality of overlapping sloped slots for fully receiving and engaging the multi-length teeth of the driver half at the time and stage when the driven half is axially moved into the driver half by only a small axial force.

15 Claims, 3 Drawing Sheets

SINGLE STAGE ENGAGEMENT COUPLING

BACKGROUND OF THE INVENTION

This invention relates to electrostatography, and more particularly to a flexible coupling for transmitting drive torque to a removably component, of an electrostatographic copier or printer, that may b be installed at one time, but not started up for operation unit a later time.

As disclosed for example in U.S. Pat. No. 2,295,003, it is well known to use flexible drive couplings for transmitting drive torque to a driven machine component. Such a coupling could be used for drive coupling a removable component such as copy sheet handling apparatus or development apparatus in an electrostatographic copier or printer, for example, to the main drive of such copier or printer.

Normally such a machine component is installed at one time, but not started up for operation until a later time, and such installation usually is accomplished in the blind. During such installations, the driver and driven halves of the coupling are also more likely, than not, to be misaligned, for example, rotationally. As a consequence, full engagement of the coupling halves is usually achieved in two different stages, at two different times.

Specifically, when the machine component such as the development apparatus above is being installed, a first stage of such two stage engagement will be to move the driven or load half of the coupling axially into the driver half of the coupling unit such axial motion is stopped. Unfortunately however, because of rotational misalignment, such axial motion-stopping contact may not represent full axial engagement between the coupling halves. As a consequence, a second stage involving some rotation of one of the halves at the later startup time, will be necessary in order to allow the driven half to move axially further into the driver half, thereby achieving full engagement.

Such two-stage, two-time engagement of a coupling have been found to result in undesirable shock loads or torque spikes, as well as, in self-defeating coupling wear of the mounting surfaces of the coupling halves. Torque spikes occur during the second stage because at the alter startup time the driver shaft must rotate, under a torque load, through some angle, before the two halves fully engage or close axially. During such rotation at such startup time, the driver half achieves an angular velocity, before the full load of the driven half is added thereto. As a consequence, the load of the driven component is added as a step function to the torque of the already moving driver shaft. The result is a shock load, that is, a torque transient or torque spike, on the driver shaft.

Such torque spikes usually are also transmitted backwards through the driver half, all the way back to the drive means, where they could undesirably interfere with the performance of other driven components int he machine. In the case of the development apparatus of an electrostatographic copier or printer, for example, such torque spikes can result in mechanical perturbations of the image development components of such copier or printer, and hence in defective or poor quality images.

In addition, self-defeating coupling wear of coupling surfaces occurs because final axial engagement motion between the driver and driven halves of the coupling occurs while torque is being transmitted by the moving driver shaft. Since the normal force on the engaging surfaces of the coupling halves is directly proportional to the torque being transmitted, the higher the torque load, the higher the coupling force must be in order to insure complete engagement. Such a high coupling force occurring before full or complete engagement of the force-transmitting surfaces of the coupling halves will undesirably result in a very high initial pressure on the initial and partial points of contacts of such forces.

As further axial penetration or movement occurs during this second stage of engagement, this torque-inflicted high force will be distributed over more and more of the force-transmitting surfaces until full penetration is achieved. Such high initial pressure results in self-defeating coupling wear of the initial points of contacts on such surfaces by gradually radiusing such points of initial contact, and thereby gradually sloping the surfaces. As such slopes increase, an axial force component that tends to defeat coupling by forcing the coupling halves open, begins to develop, and is experienced each time coupling or closing of the coupling halves is attempted.

SUMMARY OF THE INVENTION

It is an object of the present invention to provide a flexible coupling which can effectively transmit drive torque, without experiencing shock loads or torque spikes, to a removable machine component such as the development apparatus of an electrostatographic copier or printer that may be mounted or installed at one time for startup and operation at a later time.

It is another object of the present invention to provide a flexible coupling which can effectively transmit drive torque to a drivable machine component such as the development apparatus of an electrostatographic copier or printer without inflicting high pressures and self-defeating wear on the torque-transmission surfaces of the coupling.

In accordance with the present invention, a flexible coupling is provided for transmitting drive torque from a drive means to a drivable machine component. The coupling includes a rotatable driver half assembly that is connectable to the output shaft of the drive means, and that includes a radially extending member having a plurality of multi-length driver teeth for ensuring precise alignment and repeatable blind mounting of the coupling halves at a single time, and in a single stage.

The coupling also includes a rotatable driven half assembly for achieving a full and completely aligned engagement wit the driver half assembly when the driven half assembly is moved axially by a relatively small force into movement-stopping contact with the driver half assembly. The driven half assembly which is connectable to the input shaft of the drivable machine component further includes a disc member that has a plurality of slots therein for receiving the plurality of driver teeth of the driver half assembly when the driver and driven halves are being closed or coupled.

BRIEF DESCRIPTION OF THE DRAWINGS

In the detailed description of the invention below, reference is made to the drawings in which.

DETAILED DESCRIPTION OF THE PREFERRED EMBODIMENT

Figure 1:
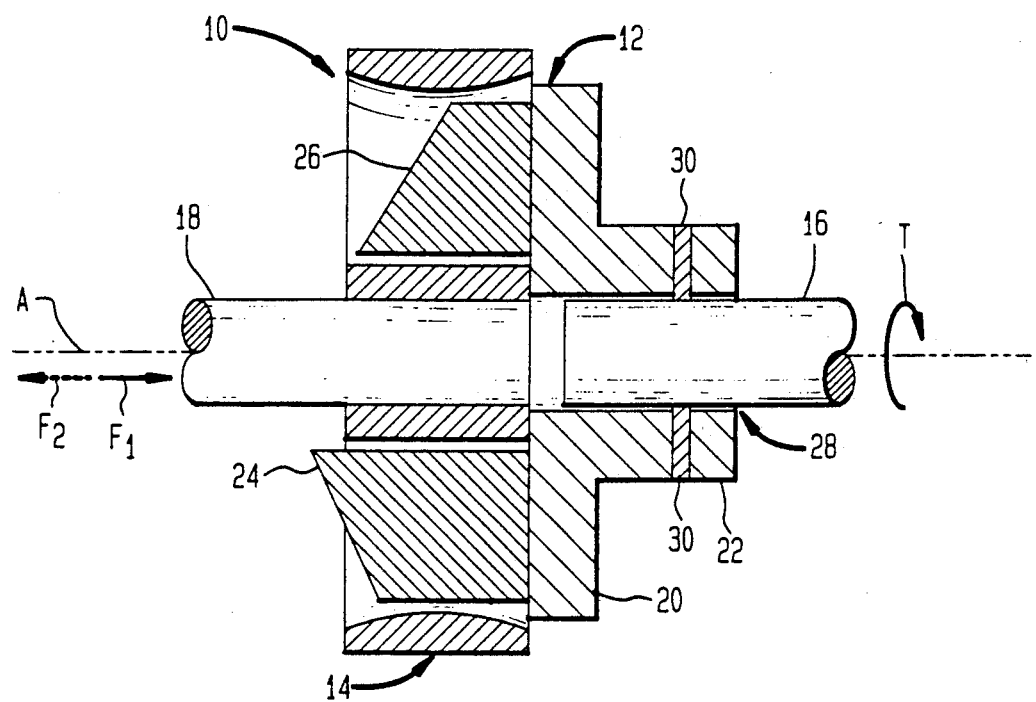
FIG. 1 is a cross-sectional view of the driver and driven halves of the coupling of the present invention fully engaged.

Referring now tot he drawings, the coupling of the present invention is generally designated 10 and includes a driver half 12 an a driven half 14. In FIG. 1, the driven half 12 and the driven half 14 are shown in a fully engaged position achieved when the driven half 14 is moved by a small axially applied force $F_1$ into such position. In such a full engagement position, a drive torque T from a drive means (not shown) can be transmitted safely and effectively by the driver half 12 to the driven half 14 at constant velocity.

For such torque transmission, an output shaft 16 of such drive means is connected to the driver half 12, and a driven shaft 18 of a machine component, such as the development apparatus of an electrostatographic copier or printer machine, is connected to the driven half 14. In the fully engaged position of FIG. 1, both halves 12 and 14 can be rotatably driven about an axis A. When desirable, the halves 12 and 14 can be opened or uncoupled merely by applying a small and opposite force $F_2$ to the driven half 14 and removing it from the driver half.

Referring now to FIGS. 1, 2A, 2B and 3, the driver half 12 of the coupling 10 comprises a base member 20, a hub 22, and a plurality of driver teeth including a first tooth 24 and a second tooth 26. The base member 20 can be a thin circular disc, or it can be a thin and narrow elongate bar. As shown clearly in FIG. 3, the member 20 extends radially and equally about the axis of rotation A. The hub 22 is cylindrical and may be formed integrally with the base member 20, or properly connected to the backside thereof for rotation therewith. The plurality of driver teeth, first and second teeth 24, 26 as shown, preferably are formed integrally with the base member 20 such that they are connected to the front side thereof, and such that lengthwise they extend axially relative to the axis of rotation A.

The first and second teeth 24, 26 form a cooperating pair. Teeth 24, 26 as shown are located on the member 20 spaced apart a distance $d_1$, and/or diametrically aligned and opposite, relative to the center and axis A of the member 20. As shown, one of the teeth, the first tooth 24 is importantly made longer than the second tooth 26.

The drier half 12, as shown, further includes means for connecting it to the output shaft 16 of the drive means. Such connecting means as shown in FIG. 2B comprise an oval shaped slot 28 for receiving the shaft 16, the submeans such as a pin 30 for movably pinning the shaft 16 within the slot 28. The shaft 16 is pinned such that it can toggle about the pin 30, and the slot 28 is shaped and sized as shown such that the driver half 12 can toggle therein a maximum of 6° relative to the axis o rotation A.

Figure 2A:
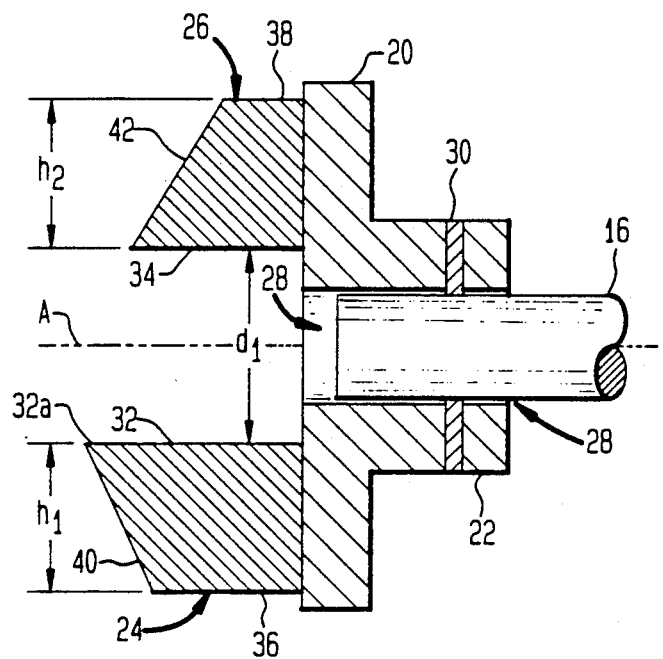
FIG. 2A is a side-sectional view of the driver half of the present invention before engagement.
Figure 2B:
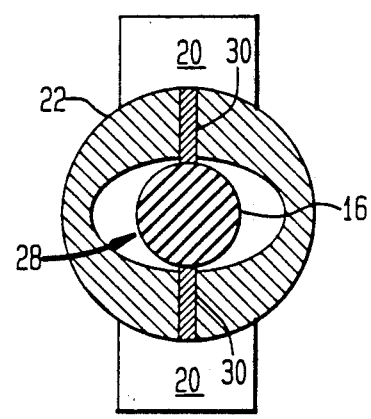
FIG. 2B is an end view, partly in section, of the driver half showing the oval mounting slot for the driver shaft.
Figure 3:
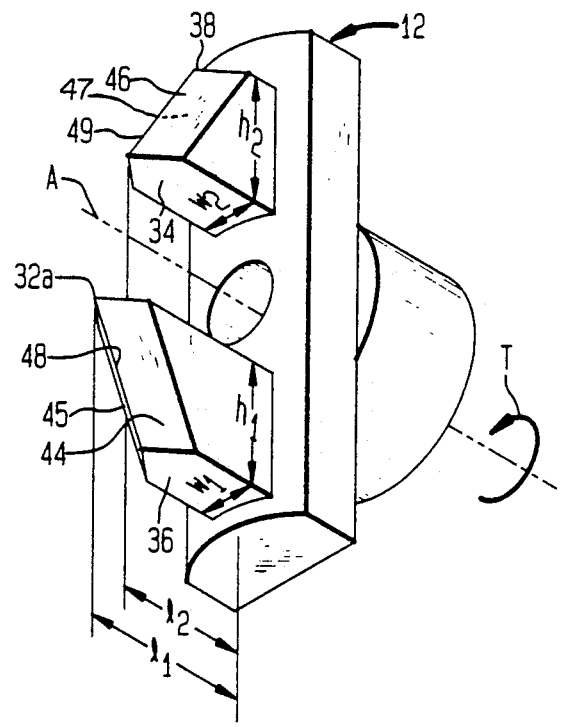
FIG. 3 is a perspective view showing the multi-length driver teeth of the driver half.

Still referring to FIGS. 2A and 3, driver teeth 24, 26 each have a length $l_1$; $l_2$; a width $W_1$, $W_2$ and a depth $h_1$, $h_2$ respectively. As connected to the base member 20, each tooth has respectively a free end, an axially extending inside surface 32, 34 adjacent the axis of rotation A, and an outside surface 36, 38 opposite such inside surface. The free end of each tooth 24, 26 includes a substantial rake or inclination 40, 42 respectively that is formed diagonally from a point on the outside surface 36, 38 to the free end tip of the inside surface 32, 34. Consequently, the outside surface 36, 38 respectively of each tooth is shorter than the inside surface 32, 34. Therefore relative to the axis A or center of the base member 20, each tooth is longer on the side (the inside 32, 34) adjacent the axis A, than on the side away therefrom.

Additionally, the free end of each tooth 24, 26 is chamferred or sharpened, forming first and second bevels 44 45 and 46, 47 (not labeled, but opposite 45) on the side surfaces interconnecting the inside and outside surface 32, 36 and 34, 38 respectively. Such chamferring, along with the raking of the free end of each tooth, creates a sharp, pointed, and inclined center edge 48, 48 at the tip 32a of the distal end of teeth 24, 26 respectively.

Figure 4:
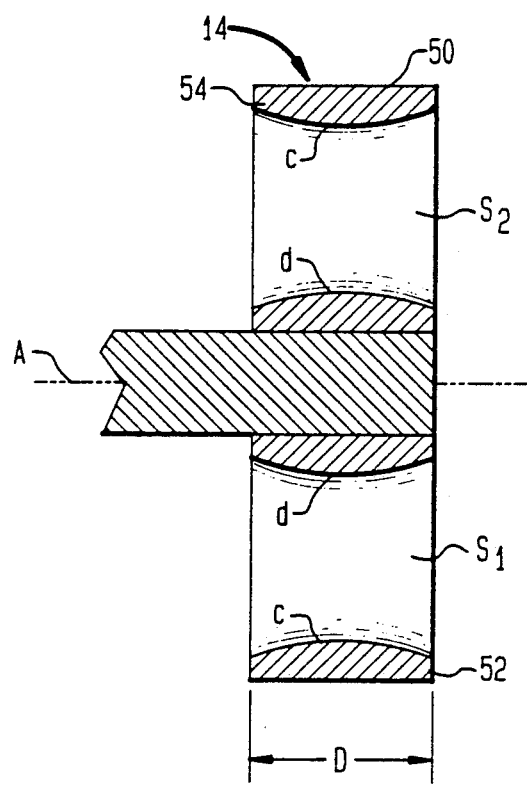
FIG. 4 is a plan view of the driven half showing its pattern of slots.
Figure 5:
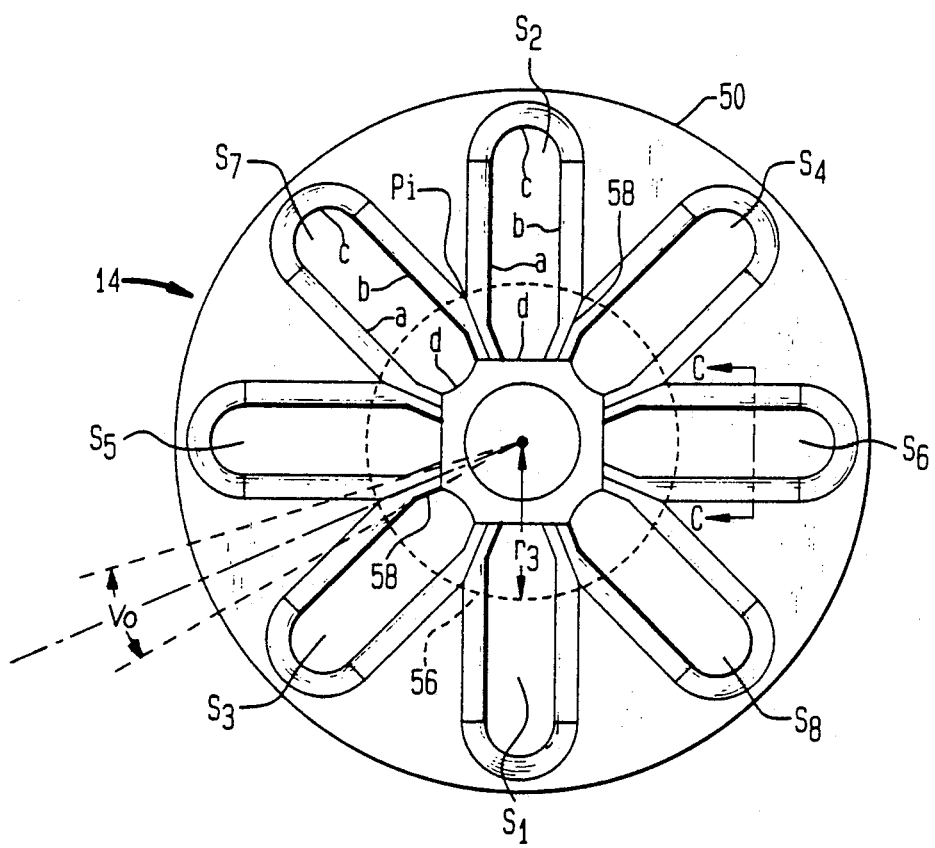
FIG. 5 is a cross-sectional view of one of the slots taken along the plane C—C, and further indicating an out-of-alignment teeth mounting.

Referring now to FIGS. 4 and 5, the driven half 14 of the coupling 10 comprises a thin circular disc member 50 having a front or coupling side 52, and a rear side 54 that is connected at its center (or axis of rotation A) to the shaft 18 of the machine component to be driven. As connected, the disc member 50 is capable of rotating through a small angle $V_0$ (FIG. 5) in either direction, that is, clockwise and counterclockwise about its axis A. Such rotation cooperatively with the toggling of the driver half 12, allows for forgiveness of rotational misalignment during the initial axial coupling approach of the halves 12, 14. Additionally, at least the frontside 52 of the member 50 is normal to the axis of rotation A. The member 50 also has a front-to-backside thickness D that is equal to or less than the length $l_1$, of the first and longer driver tooth 24.

As shown, the disc member 50 includes a plurality of pairs of radially extending slots $S_1$–$S_8$, which are formed opening from the frontside 52 into, and through the thickness D, for receiving the driver tooth 24, 26 when the driver and driven halves 12, 14 are coupled or engaged. As shown, each pair of slots $S_1$, $S_2$; $S_3$, $S_4$; $S_5$, $S_6$; and $S_7$, $S_8$ is formed such that the slots making up the pair are diametrically aligned an opposite, as well as spaced a small distance $d_2$ about the center of the disc member 50. The small distance $d_2$ for a pair of slots, for examples, the slots $S_1$ and $S_2$, is such that the driver teeth 24, 26, spaced by the distance $3_1$, can be received freely into either $S_1$ and $S_2$ or $S_2$ and $S_1$ respectively, depending on the orientation of the member 14 at such time of engagement.

Each slot $S_1$–$S_8$ includes first, second, third and fourth coupling mounting surfaces a, b, c and d, which partially define such slot, see for example slot $S_2$, FIG. 5. As labeled, the first and second surfaces a, b are opposite circumferentially, relative to the axis of rotation A of member 50, and the third and fourth surfaces c and d are opposite radially.

Figure 6:
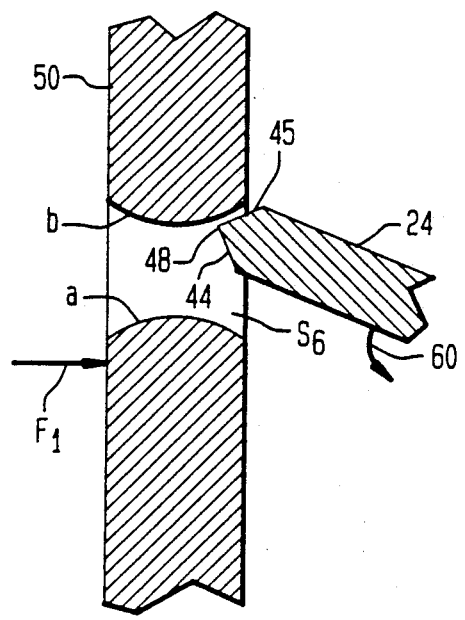
FIG. 6 is a partial cross-sectional vie of the first driver tooth of the driver member entering a slot in the driven member of the coupling of the present invention.

Each surface a, b, c, d is chamferred so as to form a slope exending from the front side 52 into the slot. As a result, each slot is wider at its opening in the front side 52 than its is further into the thickness D of member 50. The narrowest dimensions of each slot however are such as to freely receive and retain the widths $W_1$, $W_2$ and depths $h_1$, $h_2$ of the driver teeth 24, 26 as shown in FIG. 1. Furthermore, as shown in FIGS. 1, 4 and 6, each slot may be formed clear through the member 50, and the opening of each slot to the backside 54 may be similarly chamferred. Such double side chamferring will allow the driver half 12 to toggle as above when fully engaged wit the driven half 14.

Referring to FIG. 5, the slots $S_1$ to $S_8$ are arranged circumferentially in the member 50 such that the first and second sloping surfaces a and b of adjacent slots, for example, slots $S_7$ and $S_2$ (as shown) overlap or intersect at a point Pi. The series of points Pi are each spaced an equal distance $r_3$ from the center of the member 50 thereby forming a hypothetical root circle 56 about such center. The overlapping or intersecting surfaces a, b within the circle 56 create a family of interconnected sloping peaks 58 between adjacent slots. The distance $r_3$ should be slightly greater than $d_1$ in order to allow the most distal tip 32a of the free end of the inside surface 32 of the longer driver tooth 24, to contact the slots within the circle 56. The peaks 58 are such that the sharp center edge 48 of the free end of a driver tooth 24 or 26, upon making contact therewith, must slide either to the side of a of one slot or to the side b of the adjacent slot. There is no room in between.

Referring now to FIG. 6, the manner of cooperation between the special features of the driver and driven halves 12 and 14 of the coupling 10, for producing single stage full engagement, is partially illustrated. Whenever it is necessary for a customer or service person to reinstall or reload a drivable machine component such as the development apparatus of an electrostatographic copier or printer, the component (with the driven half 14 of the coupling 10 connected thereto) as described above, will be moved axially by the small force $F_1$ into engaging contact with the driver half 12. The axial force $F_1$, which may be applied manually as by pushing and sliding the machine component, is of course relatively much less than the torque force T (FIG. 1) that subsequently is applied by the main drive means of the machine through the shaft 16.

Usually, common and recommended practice for customers and service persons is to apply the force $F_1$ to install or the force $F_2$ to remove the component (FIG. 1) only when the driver half 12 is not under a torque load T form the driver shaft 16. Each such component is therefore installed or loaded for full engagement prior to the drive switch being activated for torque transmission to such component.

During such recommended installation, as the driven half 14 of the coupling 10 approaches the driver half 12, the longer tooth 24, and hence the most distal point 32a thereof, will first make contact with a point associated with one of the slots, $S_1$–$S_8$ from the front side 52 of the disc member 50. The point 32a of the tooth 24 lies on the sharp edge 48 thereof, and since $r_3$ is greater than $d_1$, the point 32a will either (a) start to move squarely into an y of the slots $S_1$–$S_8$, or (b) make contact with a sharp peak 58 or some part of a surface a or b of adjacent slots.

As designed, there is no in-between position for the point 32a upon crossing the plane of the frontside 52 of member 50. The point 32a, and hence the edge 48, and the whole free end of the longer tooth 24 will either be in full alignment within a slot $S_1$–$S_8$, or it will be forced by a sharp peak 58 to slide along a first surface a or the second surface b into either of two adjacent slots as the disc member 50 rotates through the small angle $V_0$ shown by the arrow 60, FIG. 6.

In cases in which the point 32a contacts a surface a or b of a slot $S_1$–$S_8$, the driver half 12 of the coupling 10 will toggle as above, and the member 50 will rotate through a forgiveness angle $V_0$ so as to allow the longer tooth 24 to continue to move axially by sliding into full alignment within such slot. In such a case one of the bevels 44, 45 of the free end of the tooth 24 will contact and slide along either the surface a or the surface b of the receiving slot, thereby allowing axial movement to continue despite the initial contact.

Little or no damage will be caused by such contact and sliding because such contact and sliding will occur only under a non-axial component of the already very small force $F_1$. Additionally, the materials for the member 50, as well as, the chamfer angles for the surfaces a and b of each slot, and those for the bevels 44, 45 of the tooth 24, should be selected so as to minimize the friction forces involved during such contact and sliding.

Because the tooth 26 is diametrically aligned with the tooth 24, it will responsively and simultaneously follow the tooth 24, if necessary during toggling of the tooth 24, in a direction opposite to that of the tooth 24 so as to always be diametrically aligned therewith. As such, as axial movement of the driven half 14 continues (with sliding contact between the surfaces 44 and a or 45 and b, if necessary), the shorter tooth 26 will be substantially aligned within the second and cooperating slot that is diametrically aligned with the first slot receiving the longer tooth 24. Axial movement of the driven half 14 will thus continue as first, the longer tooth 24, and then, the shorter tooth 26, are received respectively into a pair of first and second cooperating slots as described above. Such axial movement will continue until the front side 52 of the member 50 (of the driven half 14) bottoms out against the front side of the base member 20 of the driver half 12.

As is well known the machine component in such a bottomed out position can then be latched for subsequent driving therein. The component thereafter can be unlatched and removed simply by unlatching it and then applying the relatively small and opposite axial force $F_2$ in order to pull such component out, thereby uncoupling and separating the halves 12, and 14 of coupling 10.

As described, the driven and driver halves 14 and 12 of the coupling 10 are particularly capable of achieving full engagement during the time, and the single stage of axial forward movement under the relatively small force $F_1$. Because of the overlapping arrangement of the sloping surfaces a and b of adjacent slots, the first and longer tooth 24 will always be received either squarely within a slot or be forced by contact with the surface a, or b of a slot to toggle and continue axial movement by sliding into such slot.

As such, initial contact between the longer tooth 24 and the member 50 (being moved forwardly by the force $F_1$), therefore does not stop axial movement of the member 50 until full engagement is achieved. Such full engagement is achieved when the second and shorter tooth 26 responsively toggles, if necessary, and is received within the paired slot diametrically opposed to the slot receiving the first and longer tooth 24, until the front sides of the member 50 and 20 contact. The driver teeth 24 and 26 will be fully engaged within a pair of slot as shown in FIG. 1, and the component, and hence the coupling 10, can then be latched in such position for later startup and transmission of the high torque T.

As such, the coupling 10 is already fully engaged by such later startup time, thereby preventing the occurrence of torque spikes and shock loads at such start up time. Additionally, no further axial movement of the coupling halves is necessary or occurs at such later start up time, and so the high torque T is not applied undesirably on any approach portion of the surface a or b of the receiving slot. Self-defeating wear of such approach portions of the surfaces a and b are thus avoided, and the life and effectiveness of the coupling is increased.

Although the invention has been described with particular reference to a preferred embodiment, it is understood that variations and modifications can be effected within the scope and spirit of the invention.

What is claimed is:

1. A flexible coupling for transmitting drive torque from the output shaft of a drive means to the input shaft of a drivable component of an electrostatographic copier or printer, the coupling including:
    (a) a rotatable driver half assembly connectable to such output shaft of the drive means, said driver half assembly including a radially extending member having a backside and a front side, and a plurality of multi-length driver teeth attached to said front side for effecting a precisely aligned and repeatable blind mounting of the coupling halves at a single time, and in a single stage;
    (b) a rotatable driven half assembly for achieving a full and completely aligned engagement with said driver half assembly when said driven half assembly is moved axially by a relatively small force into movement-stopping contact with said driver half assembly, said driven half assembly being connectable to the input shaft of such drivable component, and said driven half assembly including a disc member having a plurality of slot therein for receiving said plurality of driver teeth of said driver half assembly when said driver and driven halves are being closed or coupled.

2. The coupling of claim 1 wherein said driver half assembly further includes a hub connected to said backside of said radially extending member, said hub having and oval opening therein for receiving said output shaft, and said output shaft of said drive means being pinned therein such that said driver half assembly can toggle a maximum of 6° about its axis of rotation.

3. The coupling of claim 1 wherein each slot of said plurality of slots formed in said disc member is spaced a small distance $d_2$ from the center of said disc member, and has a length extending radially relative to the center of said disc member.

4. The coupling of claim 1 wherein said plurality of slots includes four pairs of first and second slots, said first slot of each pair, relative to the axis of rotation of said disc member, being diametrically aligned and opposite said second slot of such pair.

5. The coupling of claim 1 wherein said plurality of slots consists of an even number of such slots spaced circumferentially around said disc member.

6. The coupling of claim 1 wherein said plurality of multi-length teeth includes a first tooth having a free end, and a second tooth also having a free end, the length of each said first and second teeth extending axially relative to the axis of rotation of said driver half assembly, said first and second teeth being spaced a small distance $d_1$, and being situated diametrically opposite each other relative to such axis of rotation, and said first tooth being longer than said second tooth.

7. The coupling of claim 1 wherein said first and second teeth each include an axially extending periphery outside surface, and an opposite inside surface adjacent the axis of rotation of said driver half, and wherein said free ends of said first and second teeth each include a rake or inclination from said outside surface towards said inside surface thereby making said axially extending outside surface of each said tooth shorter than said axially extending inside surface of said tooth.

8. The coupling of claim 1 wherein said free ends of said first and second teeth are each further sharpened by chamferring the side surfaces interconnecting said inside and said outside surfaces so as to form a sharp center edge running from the center of the free end tip of said inside surface, along the rake surface, and back to the center of the forwardmost point of said outside surface.

9. The coupling of claim 1 wherein said disc member of said driven half assembly has a thickness D, a backside wall, and a front side wall, said front side wall being normal to the axis of rotation of said driver half, and wherein said plurality of slots is formed, opening from said front side wall into said thickness D of said disc member.

10. The coupling of claim 9 wherein each slot of said plurality of slots is formed opening from said front side wall, through said thickness D, and opening through said backside wall.

11. The coupling of claim 9 wherein each said slot includes first, second, third and fourth coupling mounting surfaces partially defining such slot such that relative to the axis of rotation of the disc member, said first and second mounting surfaces are opposite circumferentially, and said third and fourth surfaces are opposite radially, each said surface being sloped into such slot so that each said slot is wider at its opening in said front wall than it is further into said thickness D of said disc member.

12. The coupling of claim 11 wherein one of said first and second circumferential mounting surfaces of one slot, immediately adjacent the other of said first and second circumferential mounting surfaces of an adjacent slot, are chamferred such that the slopes of the one and those of the said other surface overlap at a root point towards the center of said disc member, thereby creating a family of interconnected sloping peaks into said slots.

13. The coupling of claim 11 wherein said inside surfaces of each slot are each chamferred with respect to said frontside wall.

14. The coupling of claim 11 wherein said inside surfaces of each said slot are each chamferred with respect to said frontside wall, and also with respect to said backside wall thereby additionally enabling the driver teeth of the driven half of said coupling to toggle while fully engaged within said slots.

15. A flexible coupling for transmitting drive torque from the output shaft of a drive means to the input shaft of a drivable machine component, the coupling including:
    (a) a rotatable driver half assembly connectable to such output shaft of the drive means, said driver half assembly including a radially extending member having a backside and a front side, and a plurality of multi-length driver teeth attached to said front side for effecting a precisely aligned and repeatable blind mounting of the coupling halves at a single time, and in a single stage;

(b) a rotatable driven half assembly for achieving a full and completely aligned engagement with said driver half assembly when said driven half assembly is moved axially by a relatively small force into movement-stopping contact with said driver half assembly, said driven half assembly being connectable to the input shaft of such drivable machine component, and said driven half assembly including a disc member having a plurality of slots therein for receiving said plurality of driver teeth of said driver half assembly when said driver and driven halves are being closed or coupled.

* * * * *